United States Patent [19]

Takahashi et al.

[11] Patent Number: 5,050,009
[45] Date of Patent: Sep. 17, 1991

[54] VIDEO TAPE RECORDER WITH A JOINT-RECORDING CAPABILITY AND A VIDEO CAMERA HAVING THE SAME

[75] Inventors: Kimihide Takahashi; Yoshiaki Nakayama, both of Tokyo, Japan

[73] Assignee: Fuji Photo Film Co., Ltd., Kanagawa, Japan

[21] Appl. No.: 257,097

[22] Filed: Oct. 13, 1988

[30] Foreign Application Priority Data

Oct. 13, 1987 [JP] Japan .................................. 62-256194
Jul. 2, 1988 [JP] Japan .................................. 63-164116

[51] Int. Cl.$^5$ .............................................. H04N 5/76
[52] U.S. Cl. ...................................... 360/33.1; 360/14.2; 360/44; 358/906; 358/341; 358/342; 358/343
[58] Field of Search .................... 360/33.1, 14.2, 44; 358/906, 341, 342, 343

[56] References Cited

U.S. PATENT DOCUMENTS

4,358,797  11/1982  Nishijima et al. .................. 360/14.2
4,507,690   5/1985  Azuma et al. .................. 358/906 X
4,519,003   5/1985  Scholz .................................. 360/33.1

Primary Examiner—Roy N. Envall, Jr.
Assistant Examiner—Hung Tien Dang

[57] ABSTRACT

A helical scan video tape recorder includes a recording device having a head cylinder which carries magnetic heads therewith for rotating the head cylinder and applying incoming video signals to the magnetic heads to record the signals on a magnetic tape. A tape transport mechanism transports the tape while maintaining the tape in sliding contact with the head cylinder. A servo-lock sensing circuit senses a servo-locked condition in the recording device. A system controller responds to a record command entered on an operation board for controlling the tape transport mechanism to transport the tape in one direction to thereby record the video signals on the tape. In response to a record stop command also entered on the operation board, the system controller continuously records the video signals on the tape until a predetermined period of time expires after the entry of the record stop command, then controls the tape transport mechanism to stop transporting the tape, and then returns the tape by a predetermined length in the other direction. Further, upon the entry of the next record command, the system controller controls the tape transport mechanism to transport the tape in the one direction while servo-controlling the recording device and, when the servo-lock sensing circuit senses a servo-locked condition, controls the recording device to record the video signals on the tape. The predetermined period of time is selected such that a position on the tape where the servo-locked condition has been sensed substantially does not precede a position on the tape which is associated with the instant when the record stop command has been entered. A video camera may be implemented by such a video tape recorder and a video signal source which feeds video signals representative of a scene to the recorder by shooting the scene.

13 Claims, 5 Drawing Sheets

VIDEO TAPE RECORDER WITH A JOINT-RECORDING CAPABILITY AND A VIDEO CAMERA HAVING THE SAME

BACKGROUND OF THE INVENTION

1. Field of the Invention

The present invention relates to a magnetic tape recorder for recoding video signals, and audio signals if any, on a magnetic tape and, more particularly, to a video tape recorder having an end-to-end joint-recording capability and a video camera in which such a video tape recorder is built in. The word "joint-recording" used herein refers to recording on a magnetic tape a sequence of video signals which are representative of a certain scene immediately after a preceding sequence of video signals representative of a different scene without disturbing synchronization.

2. Description of the Related Art

Many of the modern video tape recorders, such as recorders for family use adopt a helical scanning system. A helical can type video tape recorder which has an end-to-end joint-recording capability as defined above has customarily been constructed to transport a magnetic tape, or a video tape, backward by a small amount at the end of a recording so as to prepare for the next recording. This conventional approach has been successful in promoting sure tracking of magnetic heads of the recorder to a particular track of a magnetic tape in which an immediately preceding recording is stored in the form of video signals, as soon as the recorder begins to operate for another recording.

However, such conventional video tape recorders as described above suffer from a drawback that unexpected video signals are written in an end portion of a preceding recording under disturbed synchronization. Specifically, assume that when a sequence of video signals representative of a certain scene are being recorded on a magnetic tape, a trigger switch for joint-recording such as a record/playback button is operated at a certain position on the tape. Then, the recording operation is immediately stopped, but the tape is caused to run by an extra length due to inertia until a tape transport mechanism of the recorder fully stops its motion, which brings about the problem stated above.

Another problem with such conventional video tape recorders is the time lag which exists between the entry of a joint-record command and the establishment of servo-lock. After the tape transport mechanism has been brought into a stop as mentioned above, the video tape is fed backward by a predetermined length and then fed forward to stop at a predetermined position. At this position, the recorder assumes a record pause status, for example, and awaits the next operation of the trigger switch. Upon the next operation of the trigger switch, the tape begins to run. Specifically, a capstan of the tape transport mechanism is rotated while, at the same time, a head cylinder carrying magnetic heads therewith is rotated. After servo-lock has been established at a certain position on the tape, another sequence of video signals are recorded on the tape in adequate synchronism. However, a certain period of time is necessary for the servo-lock to be actually established after the entry of the joint-record command. Consequently, a substantial period of time such as 1 second inclusive of the above period of time expires after the entry of the joint-record command. The waste of 1 second or so after the entry of a joint-record command is critical in shooting a desired scene by a camera.

SUMMARY OF THE INVENTION

It is therefore an object of the present invention is to provide a video tape recorder capable of surely obtaining joint consecutive recordings under accurate synchronization on a magnetic tape with a minimum of time lag.

Another object of the present invention is to provide a video tape recorder which surely joints consecutive recordings under accurate synchronization on a magnetic tape with a minimum of time lag and, when joint-recording is not desired, prevents unexpected pictures from being recorded on the tape.

In accordance with an embodiment of the present invention, there is provided a video tape recorder for recording video signals on a magnetic tape by helical scanning, comprising a recording device including a head cylinder for applying incoming video signals to a magnetic head to record the video signals on the magnetic tape by helical scanning, a tape transport mechanism for transporting the tape while maintaining the tape in sliding contact with the head cylinder, a servo-lock determining circuit for determining when the recording device is in a servo-locked condition, an operation board for entering commands which are associated with recording of the video signals on the tape, and a system controller responsive to an operation of the operation board for controlling the recording device and tape transporting mechanism. The system controller responds to a record command entered on the operation board for controlling the tape transport mechanism to transport the tape in a first direction to thereby record the video signals on the tape. In response to a record stop command also entered on the operation board, the system controller continuously records the video signals on the tape until a predetermined period of time expires after the entry of the record stop command, then controls the tape transport mechanism to stop transporting the tape, and then returns the tape by a first predetermined length in a second direction which is opposite to the first direction. Further, upon the entry of the next record command, the system controller controls the tape transport mechanism to transport the tape in the first direction while servo-controlling the recording device and, when the servo-lock determining circuit determines a servo-locked condition, controls the recording device to record the video signals on the tape. The predetermined period of time is selected such that a position on the tape where the servo-locked condition has been determined substantially does not precede a position on the tape which is associated with an instant when the record stop command has been entered.

In a specific embodiment of the present invention, the video tape recorder further comprises a rewritable storage for constantly receiving the video signals to store the video signals while being sequentially updated, and a selector controlled by the system controller for selectively applying an output of the storage and the incoming video signals to the recording device. The control means usually controls the selector to feed the video signals to the recording device and to the storage so that the storage constantly stores the video signals while being sequentially updated. In response to the record stop command entered on the operation board, the system controller stops writing the video signals in the storage to cause the storage to hold a last video signal. The system controller controls the selector to read out the video signals held in the storage and apply the read out video signals to the recording device, until a predetermined period of time expires after the entry of the record stop command. The video signals are therefore continuously recorded on the magnetic tape.

In accordance with the present invention, there is also provided a video camera comprising the video tape recorder having the above construction and a video signal source for applying video signals representative of a scene to a video signal input terminal of the recorder by shooting the scene. The recording device records those video signals on the tape.

BRIEF DESCRIPTION OF THE DRAWINGS

The above and other objects and features of the present invention will become more apparent from the consideration of the following detailed description taken in conjunction with the accompanying drawings in which.

DESCRIPTION OF THE PREFERRED EMBODIMENTS

Figure 1:
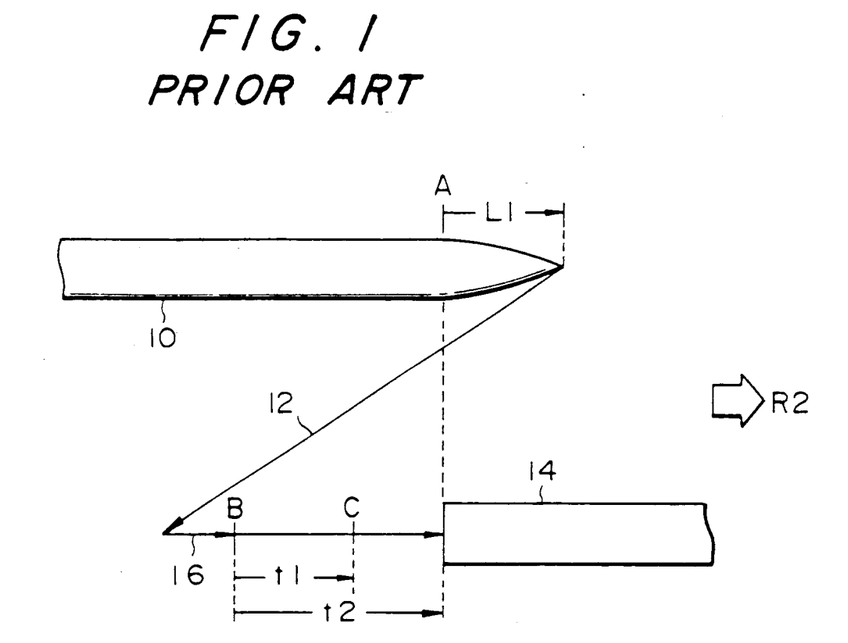
FIG. 1 is a diagram schematically illustrating a conventional end-to-end joint-recording procedure.

To better understand the present invention, a brief reference will be made to a conventional end-to-end joint-recording system which is applied to a helical scan type video tape recorder as illustrated in FIG. 1. Assume that a trigger switch installed in the recorder for joint-recording such as a record/playback button is operated when a sequence of video signals 10 have been recorded up to a position A on a magnetic tape, or a video tape, which is being transported. Then, the system immediately stops the recording operation as performed by the recorder. However, the tape runs some extra length L1 due to inertia until a tape transport system of the recorder is brought into a complete stop, and unexpected video signals are thereby recorded on the tape over the length L1 under the disturbed synchronization.

When the tape transport system is fully stopped as stated above, the tape is fed backward by a predetermined length as indicated by an arrow 12 in FIG. 1 and then fed forward by some length 16 to stop at a position B. At this position B the recorder assumes a record pause status, for example, so as to wait until the trigger switch is operated again for joint-recording. Upon the next operation of the trigger switch, the tape begins to be transported again. After a capstan of the tape transport system and a head cylinder which carries magnetic heads therewith have been rotated, servo-lock is established at a position C of the tape, for example. Thereafter, when any of the magnetic heads is brought to the accurate position A where the first recording terminated, the next sequence of video signals 14 begins to be recorded on the tape.

As illustrated in FIG. 1, a period of time of t1 is needed for the servo-lock to be established after a joint-record command has been entered at the position B on the tape. Hence, a period of time of t2 in total expires before the position A where the two video signal sequences 12 and 14 are jointed end-to-end has been reached after the entry of the joint-record command. In the conventional recorder, this time lag t2 amounts to almost 1 second. This brings about a serious problem when the recorder is used to record video signals from a camera, for example, the camera may miss a scene of concern for almost one second after the entry of a joint-record command, as discussed earlier.

Figure 2:
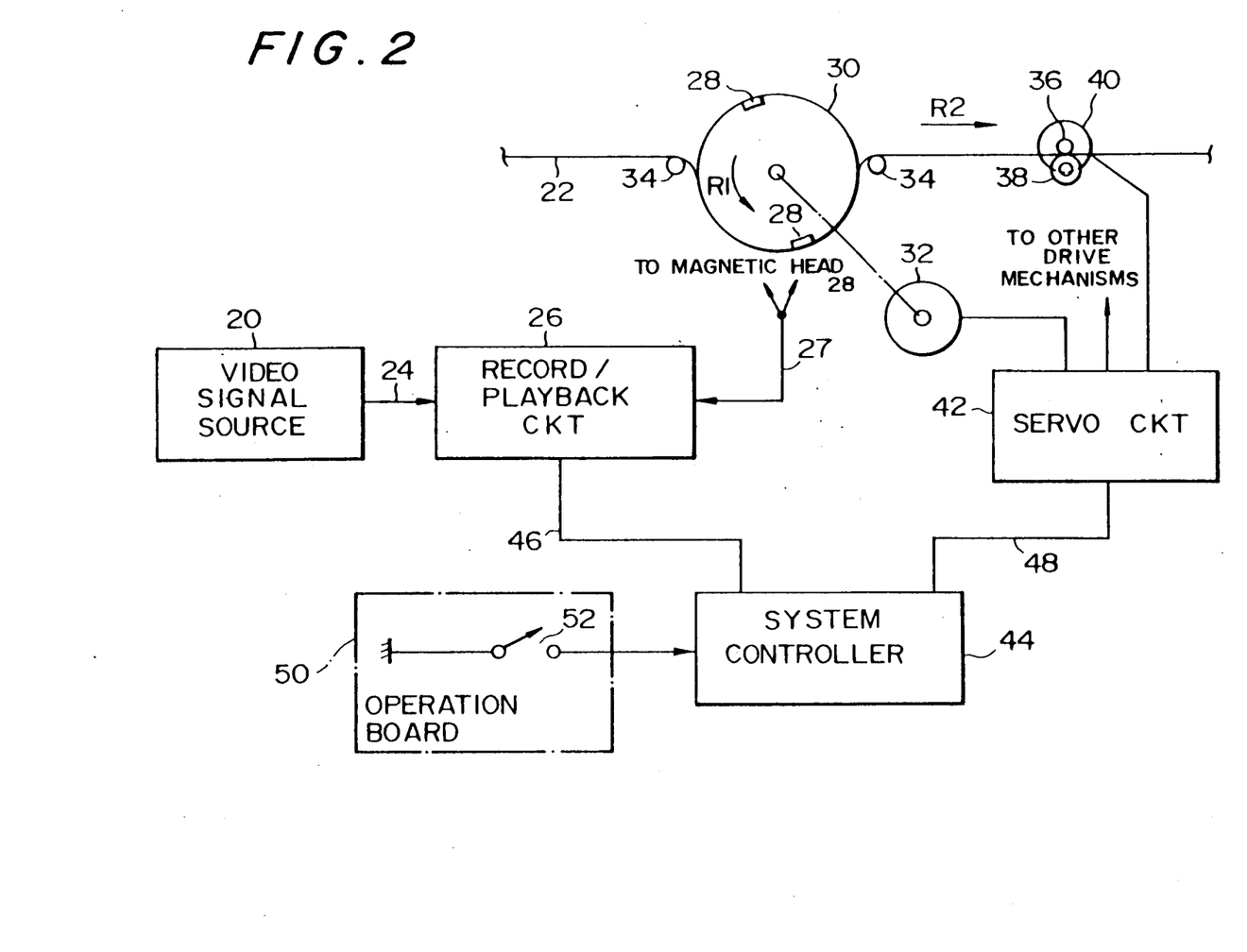
FIG. 2 is a schematic block diagram illustrating a video tape recorder with an end-to-end joint-recording capability for an embodiment of the present invention.

Referring to FIG. 2, a video tape recorder with a joint-recording capability for one embodiment of the present invention is illustrated. Generally, the video tape recorder illustrated in FIG. 2 records video signals outputted by a video signal source 20 on a magnetic tape, or a video tape, 22 by the helical scanning principle with or without audio signals associated with the video signals. The video signal source 20 is implemented as any of an imaging device, a television camera, another video tape playback device, a video signal receiver, etc. When the video signal source 20 is in the form of an imaging device by way of example, the entire video tape recorder is operable as a video camera having a recording function. In the case that the video signal source 20 is a terminal for receiving a video signal, the video tape recorder simply serves the function of a video tape recorder.

Outputs 24 of the video signal source 20, i.e., composite video signals and audio signals are fed to a record/playback circuit 26. The record/playback circuit 26 amplifies and modulates the incoming video and audio signals and delivers an output 27 to magnetic heads 28. Another function assigned to the record/playback circuit 26 is receiving composite video signals sensed by the magnetic heads 28 over the signal line 27, then amplifying and demodulating the video signals, and then supplying signals such as synchronizing signals to a system controller 44.

The magnetic heads 28 are supported by a head cylinder 30 to serve as electromagnetic transducers for recording video signals on the magnetic tape 22 and reproducing the video signals out of the tape 22. More specifically, the magnetic heads 28 write video signals appearing on the output 27 of the record/playback circuit 26 on the tape 22 by helical scanning and read video signals out of the tape 22 to apply the read video signals to the record/playback circuit 26 over the signal line 27.

The head cylinder 30 is drivably connected to a cylinder motor 32 to be rotated at a predetermined speed in a direction which is indicated by an arrow R1 in the drawing. While the video tape recorder is in operation, the tape 22 is guided by tape guides 34 in such a manner as to make sliding contact with the periphery of the head cylinder 30. In an ordinary record or playback mode, the tape 22 is transported by a capstan 36 and a pinch roller 38 as indicated by an arrow R2. The cylinder motor 32 and a capstan motor 40 adapted to drive the capstan 36 are each servo-controlled by a servo circuit 42 to rotate stably at a predetermined speed.

The system controller 44 is connected to the record/playback circuit 26 by a line 46 and to the servo circuit 42 by a line 48 so as to control the entire video tape recorder as instructed on an operation board 50. The system controller 44 may advantageously be implemented by such a processing system as a microprocessor. Connected to the system controller 44, the operation board 50 is accessible for manually entering various kinds of commands such as a record command and a playback command. In the illustrative embodiment, the operation board 50 includes a trigger switch 52 for inputting a record command. The trigger switch 50 is implemented as a non-lock button whose contact remains closed only when the button is being operated. When the contact 52 is closed, the system controller 44 decides that a record command has been entered.

The system controller 24 controls the servo circuit 42 with regard to the transport of the magnetic tape 22 and the rotation of the head cylinder 30 while controlling the record/playback circuit 26 with regard to the recording of video and audio signals on the tape 22. Further, the system controller 44 implements a joint-recording function with the tape 22 by using the above-mentioned control functions. For the joint-recording function, the system controller 44 controls the servo circuit 42 in response to a synchronizing signal which appears on the line 46, thereby causing the system into a servo-locked condition.

Figure 3:
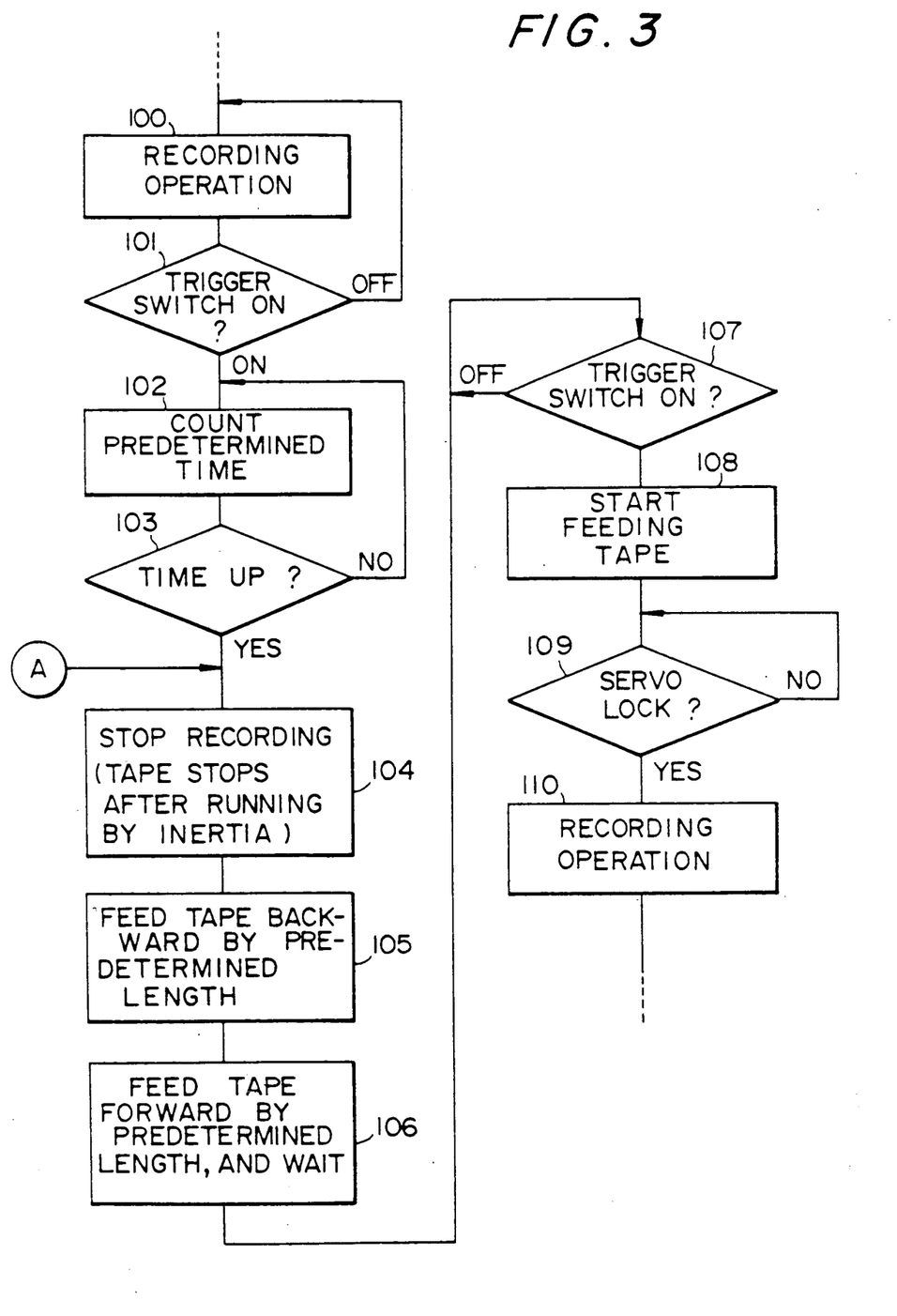
FIG. 3 is a flowchart exemplarily demonstrating a joint-recording operation of a system controller which is installed in the video tape recorder of FIG. 2.

Referring to FIG. 3, a sequence of steps for effecting a joint-recording operation are illustrated in a flowchart. While the video tape recorder is in a record mode with the record button or trigger switch 52 of the operation board 50 being operated, the system controller 44 controls the servo circuit 42 to rotate the cylinder motor 32 and the capstan motor 40 at their predetermined regulated speeds. In this condition, the head cylinder 30 carrying the magnetic heads 28 therewith is rotated at a predetermined speed in the direction R1 while, at the same time, the magnetic tape 22 is transported in the direction R2 in contact with the periphery of the head cylinder 30.

The system controller 44 conditions the record/playback circuit 26 for the record mode. Video and audio signals are fed from the video signal source 20 to the record/playback circuit 26 to be modulated and amplified. The output of the circuit 26 is fed to the magnetic heads 28 to be recorded on the tape 22 by helical scanning.

Figure 4:
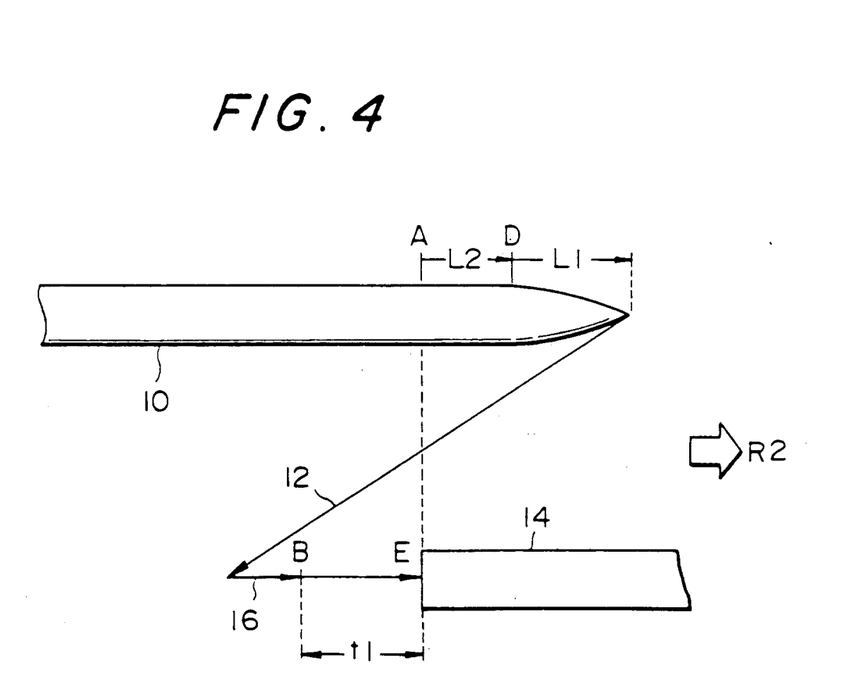
FIG. 4 is a view similar to FIG. 1, schematically illustrating the principle of joint-recording in accordance with the present invention

It is assumed that the trigger switch 52 is restored (step 101) while an operation for recording a sequence of video signals on the magnetic tape 22 is under way, e.g., when the video signals have been recorded up to a position A on the tape 22 (FIG. 4). The system controller 44 responds to the restoration of the trigger switch 52 for continuing the recording operation for a predetermined extra period of time which is associated with a predetermined length L2 as measured on the tape 22 (step 102). As the predetermined period of time expires (step 103), the system controller 44 interrupts the recording operation.

More specifically, upon the lapse of the predetermined period of time, the system controller 44 controls the servo circuit 42 to stop feeding the capstan motor 40. Even after the capstan motor 40 has been deenergized, the tape 22 is caused to run by some length L1 until the tape transport mechanism 36, 38 and 40 reaches a complete stop due to the inertia of the tape transport mechanism. Over this length L1, therefore, video signals are recorded on the tape 22 under disturbed synchronization. Consequently, the tape 22 is brought to a halt after overrunning by a distance of L2+L1 as measured from the instant of entry of the record stop command. If desired, an arrangement may be made such that video signals are prevented from being applied to the magnetic heads 28, i.e., the video signals are prevented from being recorded on the tape 22 after the position A has been reached.

When the tape transport system 36, 38 and 40 is stopped, the system controller 44 controls the servo circuit 42 such that the tape 22 is transported in a direction 12 which is opposite to the direction R2 by a predetermined length (step 105) and then fed again in the forward direction R2 by some length 16 to be stopped at the position B (step 106). It is to be noted that the feed 16 in the forward direction R2 as effected in the step 106 is far smaller in length than the reverse feed 12 and is adopted to remove play and slack of the tape 22. At the position B, the system controller 44 assumes a record pause condition and awaits the next operation of the trigger switch 52 (step 107). In the record pause condition, the head cylinder 30 continues its rotation.

When the trigger switch 52 is operated again, the system controller 44 resumes the transport of the tape 22 by controlling the servo circuit 42 (step 108). Specifically, the capstan 36 starts rotating to transport the tape 22. At this instant, the system controller 44 brings the record/playback circuit 26 into a playback mode. As the tape 22 begins to run, the magnetic heads 28 start scanning that part of the tape 22 in which the video signals 10 are stored. As the magnetic heads 28 sense the video signals, the video signals are fed to the record/playback circuit 26 via the line 27. The record/playback circuit 26 delivers the signals being sensed to the system controller 44.

In response, the system controller 44 controls the servo circuit 42 to adjust the rotation phase of the cylinder motor 32. As soon as the tape 22 reaches a steady transport speed causing an adequate synchronizing signal to appear in the signal which is fed from the record/playback circuit 26 to the system controller 44, the system controller 44 controls the phase angle of the head cylinder 30 to set up a servo-locked condition. When servo-lock is established, the synchronizing signal associated with the video signals which are stored in the running tape 22 and the phase angle of the magnetic heads 28 associated with the rotation of the head cylinder 30 are brought into synchronism. At the time when servo-locked is reached, the magnetic heads 28 are located at the position A which is associated with the instant when the trigger switch 52 was operated while the video signals 10 were recorded. In the illustrative embodiment, such a position corresponds to a position E at which a predetermined period of time t1 has expired after the resumption of the transport of the tape 22.

More specifically, the distance L1 which the tape 22 runs from the position D where the interruption of drive of the capstan motor 40 is commanded to the position where the tape 22 is actually stopped remains substantially constant. The length of forward feed 16 of the magnetic tape 22 which follows the reverse feed 12 is dependent upon the design conditions of the tape transport mechanism. Also, the interval t1 between the instant of re-operation of the trigger switch 52 which occurs at the position B and the instant of servo-lock is dependent upon various conditions of the tape transport mechanism and the head cylinder mechanism. In a specific example, the interval t1 ranges from 0.3 second to 0.5 second.

In this particular example, therefore, the distance L2 over which the tape 22 is transported from the position A where the trigger switch 52 was operated while the video signals 10 were recorded to the position D where the interruption of drive of the capstan motor 40 was commanded and the distance of reverse feed 12 of the tape 22 are selected such that the position E where servo-lock was set up substantially coincides with the above-mentioned position A. More specifically, a period of time to be set in a timer in the step 102 and the length of reverse feed 12 of the tape 22 in the step 105 are loaded in the system controller 44 such that the servo-lock position E substantially coincides with the interruption command position A. Alternatively, the servo-lock position E may follow the interruption command position A, i.e., it may be defined at a position downstream of the position A with respect to the recording direction R2.

As the servo-lock is established when any of the magnetic heads 28 is located at the position E on the magnetic tape 22, i.e., position A in the illustrative embodiment, the system controller 44 causes the record/playback circuit 26 to be in a record mode immediately. Then, the next sequence of video signals 14 (FIG. 4) are fed from the video signal source 20 to the magnetic heads 28 via the record/playback circuit 26 and begin to be recorded on the tape 22. This allows the subsequent video signals 14 to be adequately recorded on the tape 22 without having its synchronization disturbed. Moreover, the time lag particular to such end-to-end joint-recording is limited to the minimum time of t1 which is as short as 0.3 second to 0.5 second, for example. The period of time t1 is far shorter than the period of time t2 (FIG. 1) which is particular to the conventional system and, in a specific example, the former is less than one half of the latter.

Figure 5:
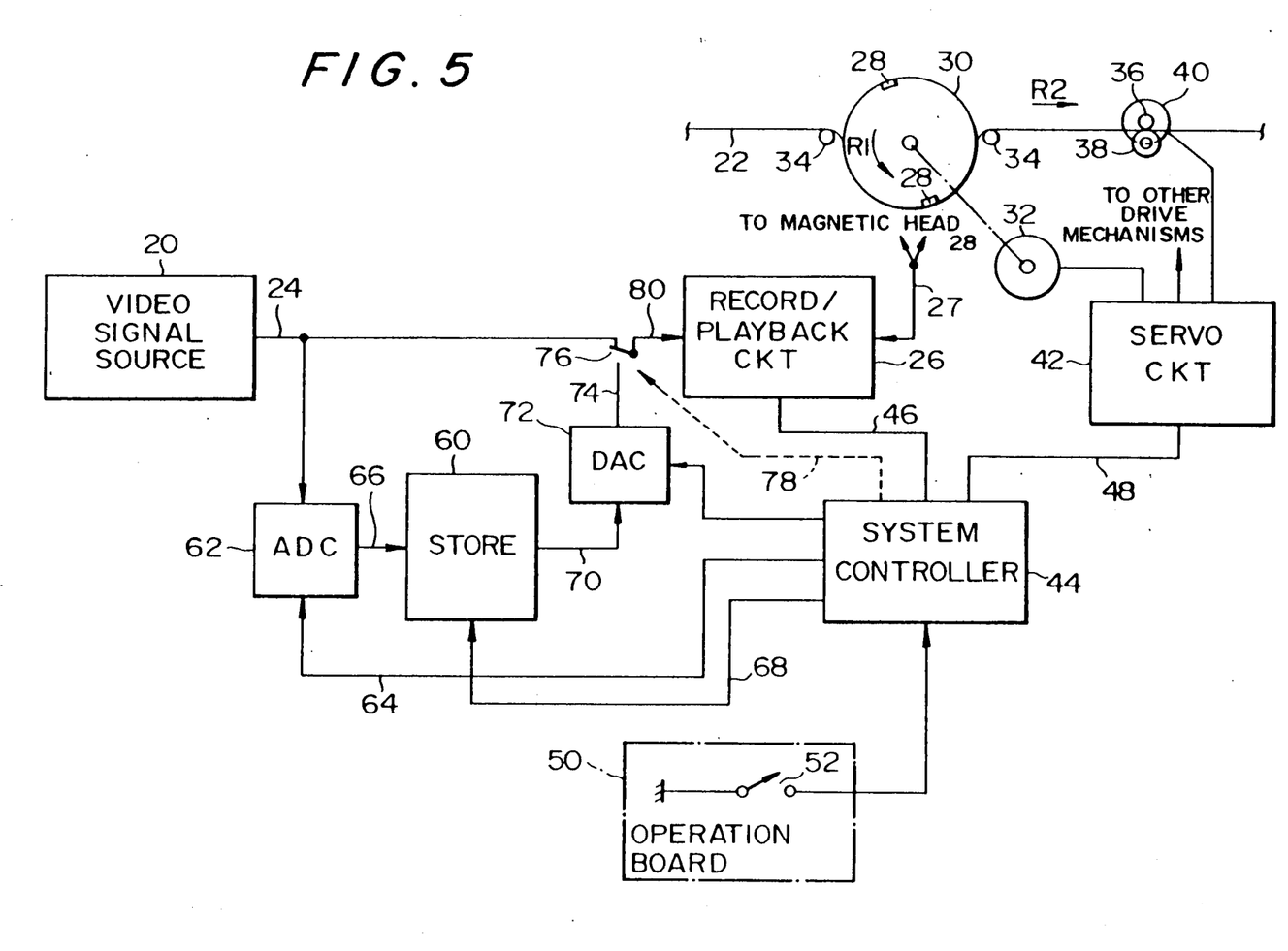
FIG. 5 is a block diagram similar to FIG. 2, illustrating another embodiment of the video tape recorder in accordance with the present invention.

Referring to FIG. 5, an alternative embodiment of the video tape recorder in accordance with the present invention is illustrated. This embodiment is different from the previous embodiment in that the former embodiment constantly stores video signals from the video signal source 20 in a storage while sequentially updating the storage and, in response to a shoot stop command, freezes an instantaneous picture and records the picture on the tape 22. In the embodiment of FIG. 5, such a unique function is implemented with a storage 60 in which video signals from the video signal source 20 may be stored in the form of digital data. An address, a write command, a read command, a clock and other control signals for writing and reading digital data out of the storage 60 are supplied from the system controller 44 on a control line 68.

The storage 60 may advantageously be implemented by a 2-port random access memory (RAM) capable of accommodating one frame of digital video data at a time. In this particular embodiment, the output 24 of the video signal source 20 is connected to an analog-to-digital converter (ADC) 62 as well. The ADC 62 serves as a signal converter which is clocked by a pixel clock fed thereto from the system controller 44 over a control line 64 for converting the incoming video signals into digital data, the resulting digital data appears on an output 66 of the ADC 62. The ADC output 66 is connected to one input port, or one write input, of the storage 60.

The storage 60 has the other port or read output 70 is connected to a digital-to-analog converter (DAC). Video signal data written in the store 60 are sequentially read out via the read output 70 in response to a read control signal which is delivered to the store 60 from the system controller 44 over a control line 68. The DAC 72 plays the role of a signal converter for converting the video signal data into an analog waveform and producing the data via an output 74 which is connected to one terminal of a switch 76.

The switch 76 selectively assumes two different positions in response to a control signal 78 which is fed thereto from the system controller 44, i.e., a position the data in FIG. 5 and a position opposite to the position of FIG. 5. Connected to the other input of the switch 76 is the output 24 of the video signal source 20. A common terminal of the switch 76 is connected to an input 80 of the record/playback circuit 26. The rest of the construction illustrated in FIG. 5 may be implemented by the elements similar to the elements illustrated in FIG. 2. The like elements are in FIG. 2 are designated by the same reference numerals and details thereof will not be described to avoid redundancy.

Figure 6:
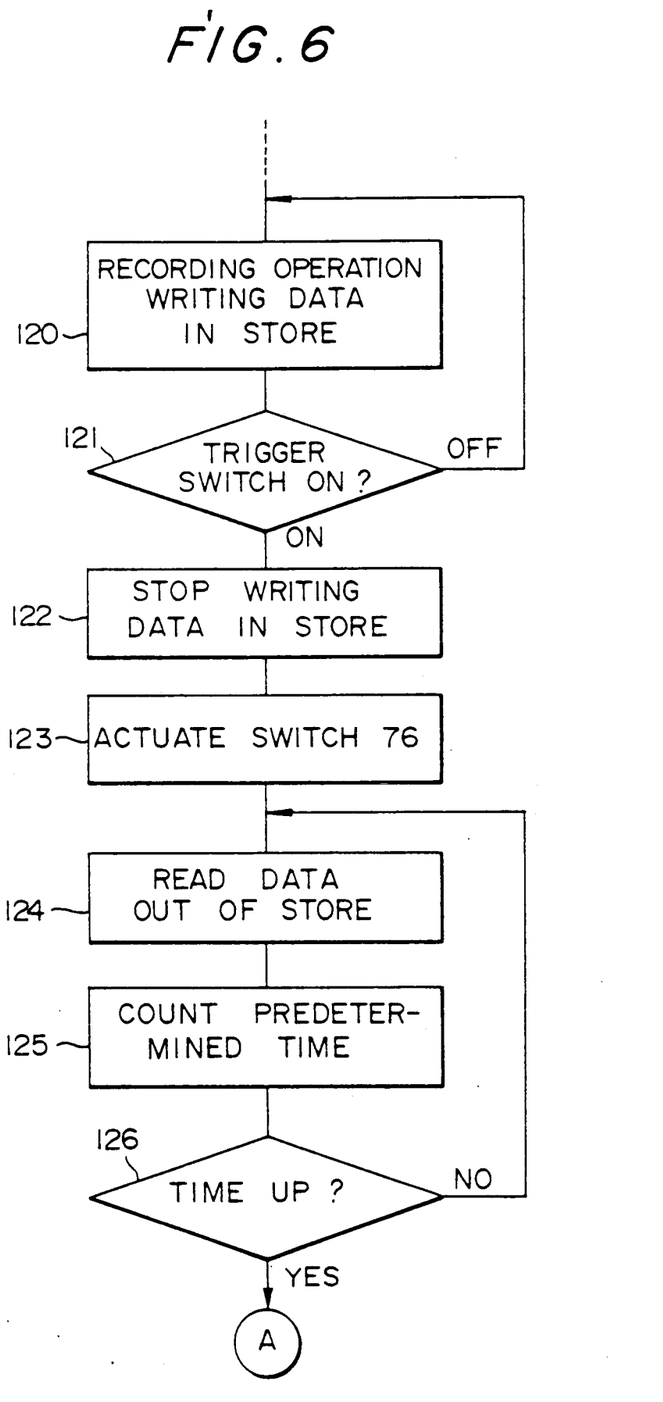
FIG. 6 is a flowchart exemplarily demonstrating a part of a joint-recording operation of a system controller which is installed in the video tape recorder of FIG. 5.

Referring to FIG. 6, the operation of the video tape recorder described above with reference to FIG. 5 is demonstrated. As illustrated, the system controller 44 maintains the switch 76 in the position of FIG. 5 while a recording operation is under way. Video signals from the video signal source 20 are applied via the switch 76 to the record/playback circuit 26 to be recorded on the magnetic tape 22 by the magnetic heads 28. The procedure described so far is the same as with the embodiment of FIG. 1.

The video signals from the video signal source 20 are also fed to the ADC 62 to be converted into digital data. Video signal data outputted by the ADC 62 are routed to the input 66 of the storage 60. Timed to the video signals from the video signal source 20, the system controller 44 delivers a write command, a write clock and addresses to the storage 60 via the control line 68. In response, the storage 60 stores the video signal data in a series of locations thereof. In this manner, the storage 60 stores one frame of video signal data, for example (step 120). Such an operation for writing video signal data in the storage 60 is repeated while sequentially updating the storage 60 in synchronism with the output of a video signal from the video signal source 20, whereby the latest video signal data are held in the storage 60 all the time.

When the trigger switch 52 is operated (step 121), a record stop command is entered. In response to this command, the system controller 44 stops delivering the write control signals to thereby interrupt the storing operation (step 122). As a result, an instantaneous video signal appears when the trigger switch 52 is operated, i.e., a video signal representative of a picture shot last is held in the storage 60 to freeze the picture.

Simultaneously, the system controller 44 actuates the switch 76 to the position which is opposite to the position of FIG. 5 (step 123). Then, the system controller 44 feeds a read command, a read clock and addresses to the storage 60 on the control line 68 so as to read one frame of video signal data out of a series of locations of the storage 60 at a television signal rate (step 124). These video signal data are converted by the DAC 72 into an analog signal which is then applied to the record/playback circuit 28 via the switch 76. The video signal in the storage 60 representative of the freezed picture is recorded in the section L2 (FIG. 4) of the tape 22 and, with the synchronism disturbed, in the section L1 as well.

In the above condition, the system controller 44 starts counting a predetermined time (step 125) and, when the predetermined time expires (step 126), transfers the control from a transfer symbol A of FIG. 6 to the step 104 of FIG. 3. This is followed by the sequence of steps 104 to 110 as illustrated in FIG. 3. As described earlier with reference to FIG. 3, the steps 104 to 110 allow the succeeding recording to be jointed with the preceding recording. Hence, up to the step 106, a video signal representative of a picture, which is freezed in the storage 60, is recorded in the sections L2 and L1 of the tape 22.

When the trigger switch 52 is left unoperated not to resume recording (step 107), the freezed picture on the tape 22 is left as it is. This is desirable for the reasons which will be described hereunder.

In the case that the video tape recorder in accordance with the present invention is applied to a camera, it may occur with the embodiment of FIG. 2 that even when the switch 52 is operated in the step 101 with the intention to stop shooting, an imaging device which constitutes the video signal source 20 continuously outputs video signals resulting in unexpected pictures being recorded in the sections L2 and L1 of the tape 22. For example, the ground or similar unexpected scene may be recorded when the camera is lowered. Should such a tape 22 without joint-recording be played back by a playback device, the unexpected pictures would be reproduced.

In the embodiment of FIG. 5, an instantaneous picture appearing when the trigger switch 52 is operated to stop shooting is freezed in the storage 60 and recorded in the sections L2 and L1 of the tape 22, as stated earlier. Hence, even when shooting is ended without joint-recording, a picture reproduced from the sections L1 and L2 by playing back the tape 22 will be the scene which was shot last and freezed. This particular embodiment, therefore, prevents pictures other than a desired picture from being recorded in the trailing end of a recording.

An alternative approach for attaining the above-stated effect may be causing the system controller 44 to control the record/playback circuit 26 in response to a record stop command in such a manner as to mute video signals from the video signal source 20. In this case, simple raster will be written in the sections L2 and L1 of the tape 22 and not an unexpected picture.

In summary, a video tape recorder in accordance with the present invention is constructed such that after the entry of a command for stopping recording preceding video signals a magnetic tape is transported by a predetermined extra length, then brought into a halt, and then transported in the reverse direction to prepare for the next recording. The overrunning length of the tape is so selected as to cause a position where servo-locked is established by a trigger ascribable to the next record command to substantially coincide with or precede a position where the previous record command was entered. Hence, the subsequent recording can be started without its synchronism with the previous recording being disturbed and in a minimum interval between the entry of a joint-record command and the establishment of servo-lock. More specifically, joint-recording is surely effected with a minimum of time lag. In addition, even when joint-recording is not desired, an expected picture is adequately recorded in the end of a recording.

The present invention is effectively applicable to, among others, a helical scan type video tape recorder and, especially, such a recorder which is equipped with a video camera.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A video tape recorder for recording video signals on a magnetic tape by helical scanning, comprising:
   recording means including a head cylinder which carries a magnetic head therewith for rotating said head cylinder and applying the video signals to said magnetic head to record the video signals on the magnetic tape by helical scanning;
   tape transporting means for transporting the magnetic tape while maintaining the magnetic tape in sliding contact with said head cylinder;
   servo-lock determining means for determining when said recording means is in a servo-locked condition;
   operating means for entering commands which are associated with recording the video signals on the magnetic tape; and
   main control means responsive to an operation of said operating means for controlling said recording means and said tape transporting means, said main control means including,
   first controlling means for controlling, in response to a record command entered on said operating means, said tape transporting means to transport the magnetic tape in a first direction to thereby record the video signals on the magnetic tape,
   continuing means for continuing, in response to a record stop command entered on said operating means, to record the video signals on the magnetic tape until a predetermined period of time expires after entry of the record stop command, controlling said tape transporting the magnetic tape by a first predetermined length in a second direction which is opposite to the first direction, and
   second controlling means for controlling, in response to a next record command entered on said operating means, said tape transporting means to transport the magnetic tape in the first direction while servo-controlling said recording means and, when said servo-lock determining means determines the servo-locked condition, controlling said recording means to record the video signals on the magnetic tape,
   wherein the predetermined period time is selected such that a position on the magnetic tape where the servo-locked condition has been determined fails to substantially precede a position on the magnetic tape which is associated with an instant when the record stop command has been entered.

2. A video tape recorder in accordance with claim 1, wherein said main control means is responsive to the record stop command entered on said operating means for returning the magnetic tape by the first predetermined length in the second direction, transporting the magnetic tape in the first direction by a second predetermined length which is shorter than the first predetermined length, and then stopping the magnetic tape.

3. A video tape recorder in accordance with claim 2, further comprising a video signal input terminal for receiving the video signals and applying the video signals to said recording means.

4. A video tape recorder in accordance with claim 1, wherein said operating means comprises a non-lock button manually operable to enter the record command, said non-lock button applying the record command to said main control means when pressed and applying the record stop command to said main control means when restored.

5. A video tape recorder in accordance with claim 1, further comprising:
rewritable storing means for constantly receiving and storing the video signals while sequentially updating said rewritable storing means; and
selecting means for selectively applying an output of said rewritable storing means and the video signals to said recording means, said selecting means including,
feed selecting means for feeding the video signals to said recording means to said rewritable storing means so that said rewritable storing means constantly stores the video signals while being sequentially updated,
stop selecting means for stopping, in response to the record stop command entered on said operating means, the video signals from being written in said rewritable storing means and causing said rewritable storing means to hold a last video signal, and
read selecting means for reading out, until said predetermined period of time expires after entry of the record stop command, the video signals held in said rewritable storing means and applying the read out video signals to said recording means, whereby the video signals are continuously recorded on the magnetic tape.

6. A video tape recorder in accordance with claim 5, wherein said rewritable storing means comprises a rewritable digital memory, and said video tape recorder further comprises:
analog-to-digital converter means for converting the video signals into digital data and storing the digital data in said digital memory; and
digital-to-analog converter means for converting the digital data read out of said digital memory into an analog signal.

7. A video tape recorder in accordance with claim 5, wherein said operating means comprises a non-lock button for manually entering the record command, said non-lock button applying the record command to said main control means when operated and applying the record stop command to said main control means when restored.

8. A video camera comprising:
a video signal source for applying video signals representative of a scene to a video signal input terminal by shooting the scene with the video camera; and
a video tape recorder for recording the video signals from said video source on a magnetic tape by helical scanning, said video tape recorder including,
recording means having a head cylinder which carries a magnetic head therewith for rotating said head cylinder and applying the video signals to said magnetic head to record the video signals on the magnetic tape by helical scanning,
tape transporting means for transporting the magnetic tape while maintaining the magnetic tape in sliding contact with said head cylinder,
servo-lock determining means for determining when said recording means is in a servo-locked condition,
operating means for entering commands which are associated with recording the video signals on the magnetic tape,
first controlling means for controlling, in response to a record command entered on said operating means, said tape transporting means to transport the magnetic tape in a first direction to thereby record the video signals on the magnetic tape,
continuing means for continuing, in response to a record stop command entered on said operating means, to record the video signals on the magnetic tape until a predetermined period of time expires after entry of the record stop command, controlling said tape transporting means to stop transferring the magnetic tape, and then returning the magnetic tape by a first predetermined length in a second direction which is opposite to the first direction, and
second controlling means for controlling, in response to a next record command entered on said operating means, said tape transporting means to transport the magnetic tape in the first direction while servo-controlling said recording means and, when said servo-lock determining means determines the servo-locked condition, controlling said recording means to record the video signals on the magnetic tape,
wherein the predetermined period of time is selected such that a position on the magnetic tape where the servo-locked condition has been determined fails to substantially precede a position on the magnetic tape which is associated with an instant when the record stop command has been entered.

9. A video camera in accordance with claim 8, wherein said continuing means is responsive to the record stop command entered on said operating means for returning the magnetic tape by the first predetermined length in the second direction, transporting the magnetic tape in the first direction by a second predetermined length which is shorter than the first predetermined length, and then stopping the magnetic tape.

10. A video camera in accordance with claim 8, wherein said operating means comprises a non-lock button manually operable to enter the record command to said first controlling means when pressed and applying the record stop command to said continuing means when restored.

11. A video camera in accordance with claim 8, further comprising:
rewritable storing means for constantly receiving and storing the video signals while sequentially updating said rewritable storing means; and
selecting means for selectively applying an output of said rewritable storing means and the video signals to said recording means, said selecting means including,
feed selecting means for feeding the video signals to said recording means and to said rewritable storing means so that said rewritable storing means constantly stores the video signals while being sequentially updated, stop selecting means for stopping, in response to the record stop command entered on said operating means, the video signals from being written in said rewritable storing means and causing said rewritable storing means to hold a last video signal, and read selecting means for reading out, until said predetermined period of time expires after entry of the record stop command, the video signals held in said rewritable storing means and applying the read out video signals to said recording means, whereby the video signals are continuously recorded on the magnetic tape.

12. A video camera in accordance with claim 11, wherein said rewritable storing means comprises a rewritable digital memory and said video camera further comprises:

analog-to-digital converter means for converting the video signals into digital data and storing the digital data in said digital memory; and digital-to-analog converter means for converting the digital data read out of said digital memory into an analog signal.

13. A method for recording video signals on a magnetic tape by helical scanning, comprising the steps of:

(a) rotating a head cylinder which carries a magnetic head therewith and applying the video signals to said magnetic head to record the video signals on the magnetic tape;

(b) transporting the magnetic tape while maintaining the magnetic tape in sliding contact with said head cylinder;

(c) determining when said step (a) is in a servo-locked condition;

(d) entering commands which are associated with recording the video signals on the magnetic tape;

(e) controlling said step (b) to transport the magnetic tape in a first direction to thereby record the video signals on the magnetic tape, in response to a record command entered at said step (d);

(f) continuing to record the video signals on the magnetic tape until a predetermined period of time expires after entry of a record tape command, controlling said step (b) to stop transporting the magnetic tape, and then returning the magnetic tape by a first predetermined length in a record direction which is opposite to the first direction in response to said record stop command entered at said step (d); and (g) controlling said step (b) to transport the magnetic tape in the first direction while servo-controlling step (a) and controlling said step (a) to record the video signals on the magnetic tape when said step (c) determines the servo-locked condition in response to a next record command entered at said step (d);

wherein the predetermined period of time is selected such that a position on the magnetic tape where the servo-locked condition has been determined fails to substantially precede a position on the magnetic tape which is associated with an instant when the record stop command has been entered.

* * * * *